United States Patent
Taoka et al.

(10) Patent No.: US 9,675,885 B2
(45) Date of Patent: Jun. 13, 2017

(54) GAME SYSTEM, A CONTROLLING METHOD OF THE GAME SYSTEM THEREOF, AND A NON-TRANSITORY COMPUTER-READABLE STORAGE MEDIUM THEREOF

(71) Applicant: Capcom Co., Ltd., Osaka (JP)

(72) Inventors: Jirou Taoka, Osaka (JP); Atsushi Fukushima, Osaka (JP)

(73) Assignee: CAPCOM CO., LTD., Osaka-Shi, Osaka (JP)

( * ) Notice: Subject to any disclaimer, the term of this patent is extended or adjusted under 35 U.S.C. 154(b) by 212 days.

(21) Appl. No.: 14/431,376

(22) PCT Filed: Sep. 20, 2013

(86) PCT No.: PCT/JP2013/005593
§ 371 (c)(1),
(2) Date: Mar. 26, 2015

(87) PCT Pub. No.: WO2014/050062
PCT Pub. Date: Apr. 3, 2014

(65) Prior Publication Data
US 2015/0246284 A1    Sep. 3, 2015

(30) Foreign Application Priority Data
Sep. 28, 2012 (JP) ................................ 2012-215669

(51) Int. Cl.
A63F 9/24        (2006.01)
A63F 13/00    (2014.01)
(Continued)

(52) U.S. Cl.
CPC ............ *A63F 13/45* (2014.09); *A63F 13/235* (2014.09); *A63F 13/35* (2014.09); *A63F 13/352* (2014.09);
(Continued)

(58) Field of Classification Search
CPC ................. A63F 2300/8023; A63F 2300/5533
See application file for complete search history.

(56) References Cited

U.S. PATENT DOCUMENTS 6,543,774 B1 *  4/2003  Taylor ...................... A63F 1/00
273/292

FOREIGN PATENT DOCUMENTS

JP    2003-053044 A    2/2003
JP    2006-043091 A    2/2006
(Continued)

OTHER PUBLICATIONS

Sega, "Daytona USA," 2001 and 2006, instruction manual.*
(Continued)

*Primary Examiner* — Kevin Y Kim
(74) *Attorney, Agent, or Firm* — IP Business Solutions, LLC

(57) ABSTRACT

A game system, a controlling method thereof, and a non-transitory readable storage medium thereof to diversify the game by diversifying the way a player character join are provided. The game system has a communication module (42) sending and receiving data so as to synchronize with a first computer operated by a first user and a second computer operated by a second user joining the game during a predetermined period before both the first user and the second user operating different characters start a first stage.

15 Claims, 6 Drawing Sheets

(51) Int. Cl.

| | |
|---|---|
| *G06F 17/00* | (2006.01) |
| *G06F 19/00* | (2011.01) |
| *A63F 13/45* | (2014.01) |
| *A63F 13/235* | (2014.01) |
| *A63F 13/35* | (2014.01) |
| *A63F 13/60* | (2014.01) |
| *A63F 13/825* | (2014.01) |
| *A63F 13/87* | (2014.01) |
| *A63F 13/95* | (2014.01) |
| *A63F 13/69* | (2014.01) |
| *A63F 13/795* | (2014.01) |
| *A63F 13/847* | (2014.01) |
| *A63F 13/48* | (2014.01) |
| *A63F 13/47* | (2014.01) |
| *A63F 13/352* | (2014.01) |

(52) U.S. Cl.
CPC .............. *A63F 13/47* (2014.09); *A63F 13/48* (2014.09); *A63F 13/60* (2014.09); *A63F 13/69* (2014.09); *A63F 13/795* (2014.09); *A63F 13/825* (2014.09); *A63F 13/847* (2014.09); *A63F 13/87* (2014.09); *A63F 13/95* (2014.09)

(56) References Cited

FOREIGN PATENT DOCUMENTS

| JP | 2010-167251 A | 8/2010 |
|---|---|---|
| JP | 4811888 B | 11/2011 |

OTHER PUBLICATIONS

Sega, "Daytona USA," 2006, article http://www.gamespot.com/articles/daytona-usa-network-racing-hands-on/1100-2689603/.*

English Abstract and Machine translation for JP2006-043091, Publication Date: Feb. 16, 2006.

English Abstract and Machine translation for JP2003-053044, Publication Date: Feb. 25, 2003.

English Abstract and Machine translation for JP2011-098230, Publication date: May 19, 2011 for JP4811888B, Publication Date: Nov. 9, 2011.

English Abstract and Machine Translation for JP2010-167251A, Publication Date: Aug. 5, 2010.

Yuya Niioka et al., Ace Combat X2 Joint Assault Perfect Guide Book, 1st edition, Enterbrain, Inc., Sep. 22, 2010, pp. 36 to 37.

International Search Report dated Oct. 15, 2013 issued in corresponding PCT/JP2013/005593 application (pp. 1-2).

* cited by examiner

GAME SYSTEM, A CONTROLLING METHOD OF THE GAME SYSTEM THEREOF, AND A NON-TRANSITORY COMPUTER-READABLE STORAGE MEDIUM THEREOF

FIELD OF THE INVENTION

This invention relates to a game system controlling actions of characters in a virtual game space, a controlling method thereof, and a non-transitory computer-readable storage medium thereof.

BACKGROUND OF THE INVENTION

Generally, Video games such as action games and role-playing games make characters act in a virtual game space correspondingly to operation input by users. In such games including multi-playable games, a plurality of player characters operated by a plurality of users is made to be appeared, and the plurality of player characters progresses the game cooperatively (as described in Patent literature 1).

In such multiplayer games, a session participated by the plurality of users is created for each stage on one of computers operated by the plurality of users or a network server communicably connected with the computers. Thereby, the session is an area allowing communication connection among the plurality of users. The stage will be multi-playable when a user (host player) creates a session, and another user (guest player) joins the first session, as described in Patent literature 2.

In the games with the plurality of player characters are composed of a plurality of scenarios corresponding to the plurality of player characters. For example, a game includes a scenario 1 progressed by a player character A teaming up with a player character B and a scenario 2 progressed by a player character C teaming up with a player character D.

PRIOR ART

Patent Literature

Patent literature 1: Japanese Patent No. 4811888
Patent literature 2: JP-A 2010-167251

SUMMARY OF THE INVENTION

Technical Problem

Conventionally, in the multiplayer games, a first session created by a first user is not able to be participated by a second user joining a second session in the middle of the session. Especially, in a game that is configured to operate one of player characters while following the plurality of scenarios, in a scenario, a user cannot operate a player character operable in another scenario. Therefore, the plurality of player characters operable in different scenarios has low relative mutually, then diversifying games is not sufficiently succeeded.

The present invention provides a game system, a controlling method thereof, and a non-transitory computer-readable storage medium thereof to diversify the game by diversifying ways of participation of player characters are provided.

Solution of Problem

In the present invention relates to a game system including: a game control module for generating a virtual game space of a game that a plurality of users can join and progressing the game by making a first character corresponding to a first user operating a first computer act correspondingly to operation input on the first computer by the first user in the virtual game space; and a communication module for sending and receiving data so as to synchronize the game with a second computer operated by a second user joining the game; wherein the game is progressed by completing a plurality of stages included in the game one after another, wherein the communication module synchronizes the game between the first computer and the second computer during a predetermined period before both the first user and the second user start a first stage (hereinafter crossover stage), and wherein the game control module controls actions of the first character corresponding to the first user and a second character corresponding to the second user in the same virtual game space in the crossover stage that is at least one of the plurality of stages.

Effect of the Invention

The present invention diversifies games by diversifying ways of participation of player characters.

DESCRIPTION OF EMBODIMENTS

Figure 1:
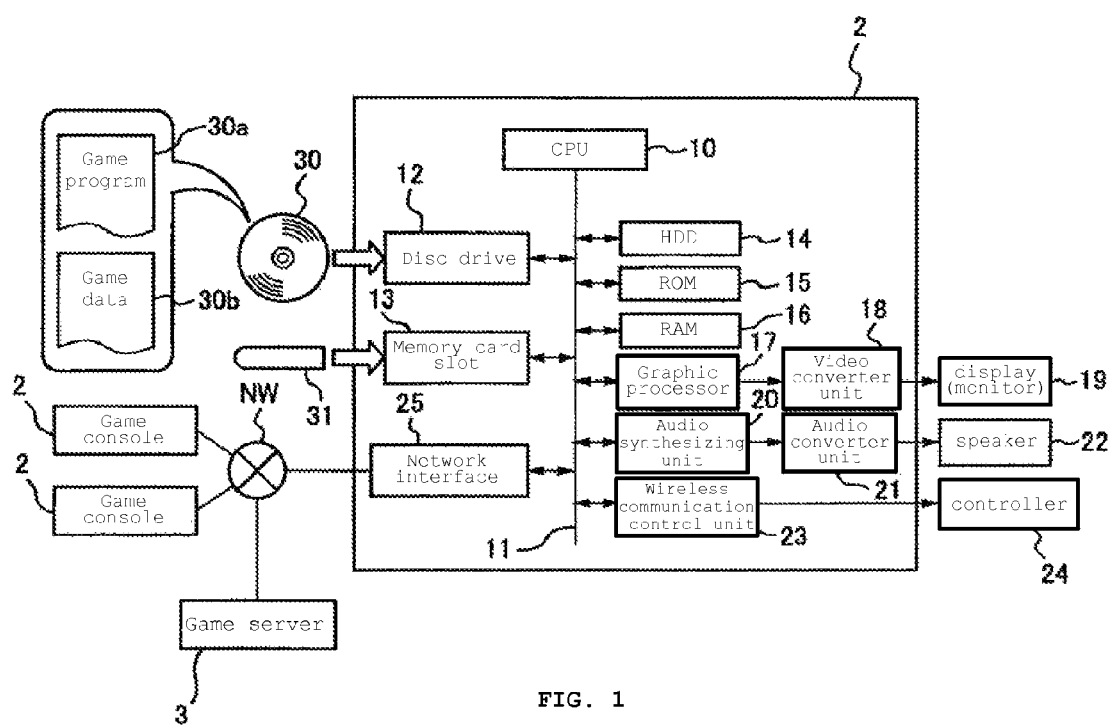
FIG. 1 is a block diagram of hardware configuration of a game console according to one embodiment of the present invention.

One embodiment of the present invention relates to a game system including:
a game control module for generating a virtual game space of a game that a plurality of users can join and progressing the game by making a first character corresponding to a first user operating a first computer act correspondingly to operation input on the first computer by the first user in the virtual game space; and a communication module for sending and receiving data so as to synchronize the game with a second computer operated by a second user joining the game; wherein the game is progressed by completing a plurality of stages included in the game one after another, wherein the communication module synchronizes the game between the first computer and the second computer during a predetermined period before both the first user and the second user start a first stage (hereinafter crossover stage), and wherein the game control module controls actions of the first character corresponding to the first user and a second character corresponding to the second user in the same virtual game space in the crossover stage that is at least one of the plurality of stages.

The game includes a plurality of scenarios configured to combine the plurality of stages, and the crossover stage is at least one of stages common in the plurality of scenarios.

Wherein the crossover stage is a stage just after a predetermined stage (hereinafter previous stage); wherein the communication module synchronizes the game between the first computer and a third computer, which is operated by a third user who operates a third player character and joins the scenario joined by the first user in the previous stage; wherein the game control module controls actions of the first character and the third character to make act in the same virtual game space in the previous stage; the communication module synchronizes the game between the first computer and the second computer while keeping the synchronization between the first computer and the third computer in the crossover stage when the first computer and the third computer have been synchronized in the previous stage; and wherein the game control module controls actions of the first character, the second character, and the third character to make act in the same virtual game space in the crossover stage.

The communication module synchronizes the game between the first computer and the third computer in a next stage after the crossover stage is over (completed) when the game has been synchronized between the first computer and the third computer in the previous stage.

One embodiment of the present invention may be also include a non-player character control module for controlling actions of the second character as a non-player character when the second computer has been out of synchronization, wherein the non-player character control module controls actions of the second character as the non-player character in the virtual game space on the first computer when the second computer has been out of synchronization while progressing the crossover stage synchronously between the first computer and the second computer.

One embodiment of the present invention relates to a method controlling game system comprising: the step of game control for generating a virtual game space of a game that a plurality of users can join and progressing the game by making a first character corresponding to a first user operating a first computer act correspondingly to operation input on the first computer by the first user in the virtual game space; and the step of communication for sending and receiving data so as to synchronize the game with a second computer operated by a second user joining the game; wherein the game is progressed by completing a plurality of stages one after another, wherein the step of communication synchronizes the game between the first computer and the second computer during a predetermined period before both the first user and the second user operating different characters start a first stage (hereinafter crossover stage), and wherein the step of game control for controlling actions of the first character corresponding to the first user and a second character corresponding to the second user in the virtual game space in the crossover stage that is at least one of a plurality of predetermined stages.

One embodiment of the present invention relates to a non-transitory computer-readable storage medium storing a program for causing a computer to execute a process, comprising: the step of game control for generating a virtual game space of a game that a plurality of users can join and progressing the game by making a first character corresponding to a first user operating a first computer act correspondingly to operation input on the first computer by the first user in the virtual game space; and the step of communication for sending and receiving data so as to synchronize with a second computer operated by a second user joining the game; wherein the game is progressed by completing a plurality of stages one after another, wherein the step of communication synchronizes the game between the first computer and the second computer during a predetermined period before both the first user and the second user operating different characters start a predetermined stage (hereinafter crossover stage), and wherein the step of game control for controlling actions of the first character corresponding to the first user and a second character corresponding to the second user in the virtual game space in the crossover stage that is at least one of a plurality of predetermined stages.

Hereinafter a game system, a controlling method thereof, and a non-transitory computer-readable storage medium thereof will be described with reference to the drawings.

Configuration of the Game

One embodiment of the present invention, action games executed on a home video game console are described below. The action games relating to the embodiment according to the present invention are progressed searching items and/or completing predetermined missions while operating the player character and fighting against enemy characters in the virtual game space. The present invention is disclosed specifically in multiplayer games progressed by a plurality of player characters correspondingly to the plurality of users fighting against enemy characters cooperatively together.

In one embodiment of the present invention, in the game, the scenario (main game) having predetermined mission (objective) is progressed by users operating player characters. The scenario includes a plurality of stages changed correspondingly to progress of the scenario. The plurality of stages is set each condition to complete. The stage in claims and description of the present invention, "stage" is a part of the main game. For example, the stage includes "chapter" partitioned corresponding to progress or area to act on in a story, and "round" partitioned correspondingly to times of the game. The stage includes not only partitions corresponding to the game contents but also not corresponding to the game contents. For example, the stage may be a part between loadings to load a part of the main game.

Before starting the main game or each stage, a matching process for matching a host player creating a first session and a third user joining the first session is executed. When the third user joins the first session, the third user progresses the main game as a guest player cooperatively with the host player. In the matching process before the stage during the scenario, only users having completed the last stage may create a session or join the session.

On each stage configuring the game, enemy characters impede the player characters to advance. In multiplayer games, each player character joining the session progresses the scenario cooperatively together while attacking and fighting against the enemy characters.

Hardware Configuration

A game system according to the present invention includes a game console (computer device) 2 described below and external devices such as a monitor 19, a speaker 22, and a controller 24. The game system executes the game based on a game program 30a and a game data 30b loaded from a disc-type storage medium 30 described below. FIG. 1 is a block diagram of hardware configuration of a game console 2 according to the present invention. As illustrated in FIG. 1, the game console 2 is mutually communicable between the game console 2 and a game server 3 via a communication network (NW) such as internet or Local Area Network (LAN). The game console 2 includes a Central Processing Unit (CPU) 10 that is a computer controlling its operation. The CPU 10 is coupled to a disc drive 12 and a memory card slot 13, and a Hard Disk Drive (HDD) 14, a Read Only Memory (ROM) 15, and Random Access Memory (RAM) 16 that are means for storing program via a bus 11.

The disc-type storage medium 30 such as a DVD-ROM can be loaded to the disc drive 12. The game program 30*a* and the game data 30*b* relating to the present invention are recorded to the disc-type storage medium 30. The game data 30*b* includes such as characters on the game according to the present invention, and objects and texture constructing the virtual game space. A card-type non-transitory storage medium 31 can be loaded to the card-type memory card slot 13. The card-type non-transitory storage medium 31 stores save data including play status such as progress of the game accordingly to commands from the CPU 10.

The HDD 14 is a mass storage medium contained in the game console 2. The HDD 14 stores the game program 30*a* and the game data 30*b* loaded from the disc-type non-transitory storage medium 30, save data etc. The ROM 15 is a semiconductor memory such as a mask ROM or a Programmable Read Only Memory (PROM). On the ROM 15, such programs booting up the game console 2 and controlling operations when the disc-type storage medium 30 is loaded are stored. The RAM 16 includes a Dynamic Random Access Memory (DRAM), or a Static Random. On the RAM 16, the game program 30*a* to be executed by CPU 10, the game data 30*b* required executing the program 30*a*, etc. are loaded from the disc-type storage medium 30 or the HDD 14 correspondingly to the play status in the game and temporarily stored.

The CPU 10 is connected to a graphic processor 17, an audio synthesizing unit 20, a wireless communication control unit 23, and a network interface 25 via the bus 11.

The graphic processor 17 generates game graphics including the game space and characters accordingly to commands from the CPU 10. The graphic processor 17 is connected to a video converter unit 18. And, the graphic processor 17 is also connected to an external display (monitor) 19 via the video converter unit 18. The game graphics generated in the graphic processor 17 are converted to a motion picture format in the video converter unit 18 and displayed on the monitor 19.

The audio synthesizing unit 20 plays and synthesizes a digital game sound accordingly to commands from the CPU 10. The audio synthesizing unit 20 is connected to an audio converter unit 21. And the audio synthesizing unit 20 is also connected to an external speaker 22 via the audio converter unit 21. Therefore the game sound played and synthesized on the audio synthesizing unit 20 is decoded to analog signal on the audio converter unit 21 and output from the speaker 22.

A wireless communication control unit 23 includes a 2.4 GHz wireless communication module. The wireless communication control unit 23 is wirelessly connected to a controller 24 that is an accessory for the game console 2, and both send and receive data mutually. Users can input signal to the game console 2 by manipulating an operating device (not illustrated) such as a controller button on the controller 24. Therefore users can operate player characters displayed on the monitor 19 with controller 24. The game console 2 is connected to the communication network such as internet or LAN via a network interface 25. In other words, the game console 2 is communicable with a second game console 2 or a game server 3 through the network interface 25. By connecting the first game console 2 and the second game console 2 via communication network sending and receiving data mutually, the first game console 2 can synchronize the game and display the plurality of player characters in the same virtual game space in synchronization with second game console 2. Therefore, a multi-player game that the plurality of users cooperatively progresses the game works.

Configuration of a Game Console

Figure 2:
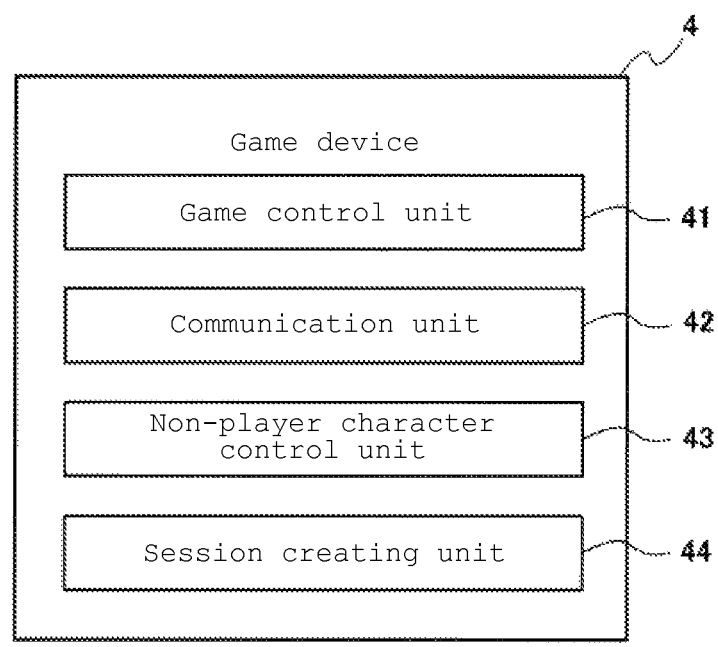
FIG. 2 is a block diagram illustrating a functional configuration of the game console illustrated in FIG. 1.

FIG. 2 is a block diagram illustrating a functional configuration of a game console 2 illustrated in FIG. 1. As illustrated on FIG. 1, the game console 2 functions as a computer containing a game device 4 including the CPU 10, the HDD 14, the ROM 15, the RAM 16, the graphic processor 17, the video converter unit 18, the network interface 25, etc. As illustrated in FIG. 2, the game device 4 in the game console 2 makes a game control unit (game control module) 41, a communication unit (communication module) 42, a non-player character control unit (NPC control unit, non-player character control module) 43, a session creating unit (session creating module) 44, etc. function by executing the game program 30*a*. In one embodiment of the present invention, as a first computer, a computer in the game console 2 of a first user described below makes the units 41, 42, 43, and 44 function. Besides, a game console 2 of the third user may make the units 41, 42, 43, and 44 function. In addition to the game console 2, a computer other than the game console 2 such as a game server 3 coupled to the game console 2 of each user may make the units 41, 42, 43, and 44 function.

The game control unit 41 controls progress of the game. The game control unit 41 establishes the virtual game space that the plurality of users can join. The game control unit 41 controls actions of a first character corresponding to the first user in the virtual game space correspondingly to operation input on the first computer by the first user. At the same time, the game control unit 41 virtualizes and displays the virtual game space that the characters act on and the characters on the monitor 19. For example, the game control unit 41 loads data such as objects and textures that is included in the game data 30*b* and virtualizes a three dimensional (hereinafter 3D) virtual game space as a player character acts. Furthermore, the game control unit 41 visualizes two dimensional (hereinafter 2D) image of the 3D virtual game space viewed from a predetermined virtual camera for displaying on the monitor 19 Then, the game control unit 41 controls actions of characters in virtual game space correspondingly to operation input on the controller 24 by the first user or progress of the game.

The communication unit 42 sends and receives the data so as to synchronize between the first computer and a third computer operated by the third user joining the game. When computers in a plurality of game consoles 2 communicates mutually, the game may be configured as online games that each computer is connected to a predetermined server, and then, progress of the game is managed on the server. Instead, the game may be configured as, for example, the online games that a predetermined matching server matches a plurality of computers correspondingly to requests from each computer, wherein the online game progressed by the plurality of computers communicating mutually through peer to peer (P2P) communication.

The NPC control unit 43 controls actions of non-player characters acting against player characters of each user in the virtual game space. In one embodiment of the present invention, a non-player character includes enemy character attacking the player characters. The NPC control unit 43 controls a character used to be operated by the third user as a non-player character when the third computer has been out of synchronization.

The session creating unit 44 individually creates the session to be joined by a plurality of users in the plurality of stages. The session creating unit 44 accepts participation of the third user operating the third computer in the game The communication unit 42 communicates among computers of each user when the session has been created. The session may be newly created in the plurality of stages individually. Except for a crossover stage described below, after creating the session before starting the same scenario, the session may be maintained unless a player character joining the session leaves, or the session is impossible to be maintained because of communication failure.

For example, in the game communicated through P2P, the first computer of the first user (host player) sends a signal requesting for creating the session to the matching server. The session creating unit 44 in the first computer operated by the host player or the matching server creates the session correspondingly to the signal requesting for creating the session. Information of the session is on a list of the session on the matching server, and the information is stored temporarily on the RAM 16. On the other hand, when the third user (guest player) joins the session created by the host player, the third computer of the guest player sends a signal for requesting information of the session to the matching server correspondingly to the operation input by the third user. The matching server sends the list stored temporarily to the third computer. The third computer makes the list of the session displayed on a game screen. When the guest player chooses one session from the list, the third computer sends a signal for participation to the matching server. The matching server sends information (such data as game data and character data of users playing with) required for P2P communication to each computer of the users joining the same session. Then, the computers of the users joining the same session communicate mutually through P2P communication, and the session is established.

After the session is established, a third player character corresponding to the third user is controlled by the game control unit 41 in the third computer. Then control information of the third player character is sent to the computers of the users through the communication unit 42. Each computer receiving the control information reflects the control information on the third player character in the same virtual game space.

The session may be created on a network server (e.g. the matching server) set on a communication path between the first computer and the third computer. Instead, the session may be created on the first computer or the third computer. In one embodiment of the present invention, the third user (guest user) joins the session created by the first user (host player) who is one of users. In consequence, the plurality of users may progress the game in the same virtual game space.

In one embodiment of the present invention, a user may select a player character to operate from a plurality of player characters. The game includes a plurality of scenarios configured with combination of a plurality of stages. The player character acting accordingly to the scenario is predetermined on the plurality of scenarios. The plurality of scenarios includes the plurality of stages to complete in predetermined order while following each scenario. Each stage set on the same scenario includes same setting of stages (the game spaces that the player charters placed), and same objective (conditions for completion). The setting of stages or the objective on at least one of stages configuring each scenario is different among a plurality of different scenarios. Therefore, playable characters, content of stage, condition for completion, or orders for completing, etc. are differently set on each scenario. The stage to progress next may be varied correspondingly to such as the selection of users or the user's satisfaction of a predetermined condition.

In one embodiment of the present invention, the plurality of scenarios is mutually interlinked (crossover) each other. For example, the plurality of scenarios includes common stages (hereinafter crossover stage) that protagonists of each scenario encounter. The crossover stage may have common condition for completion not varied by each scenario, for example, defeating an enemy character E Instead, each scenario may have different condition for completion. For example, in a first scenario, the objective may be defeating the enemy character E. The other hand, in a second scenario, the objective may be finding an item F, and the player character may progress to the next stage without defeating the enemy character E.

The communication unit 42 synchronizes between a first computer operated by a first user operating a player character in the first scenario and a second computer operated by a second user operating a second character in a second scenario different from the first scenario when the progress of game is in predetermined period before the crossover stage starts.

A Crossover Process

Figure 3:
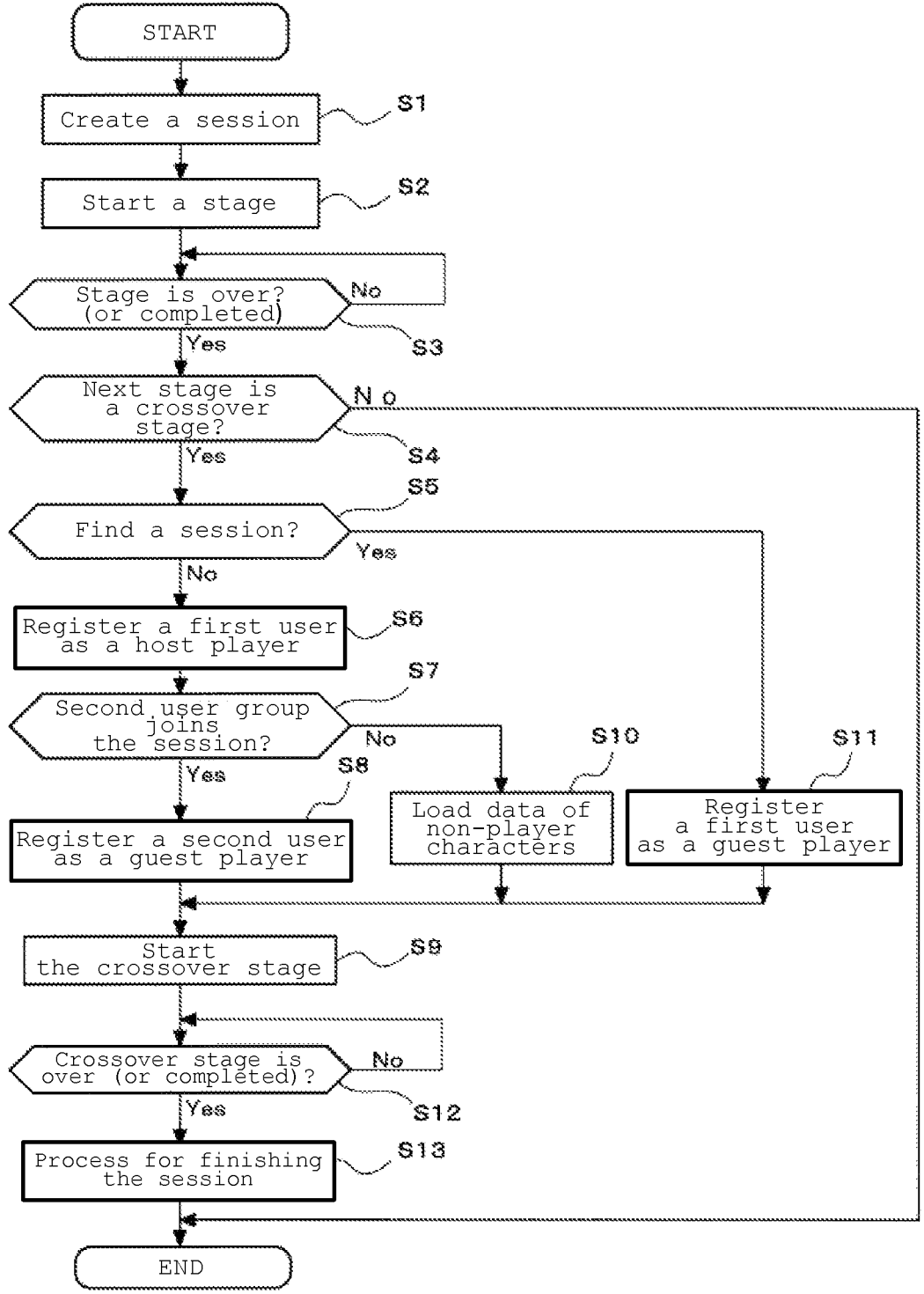
FIG. 3 is a flowchart illustrating a process for a crossover according to one embodiment of the present invention.
Figure 4:
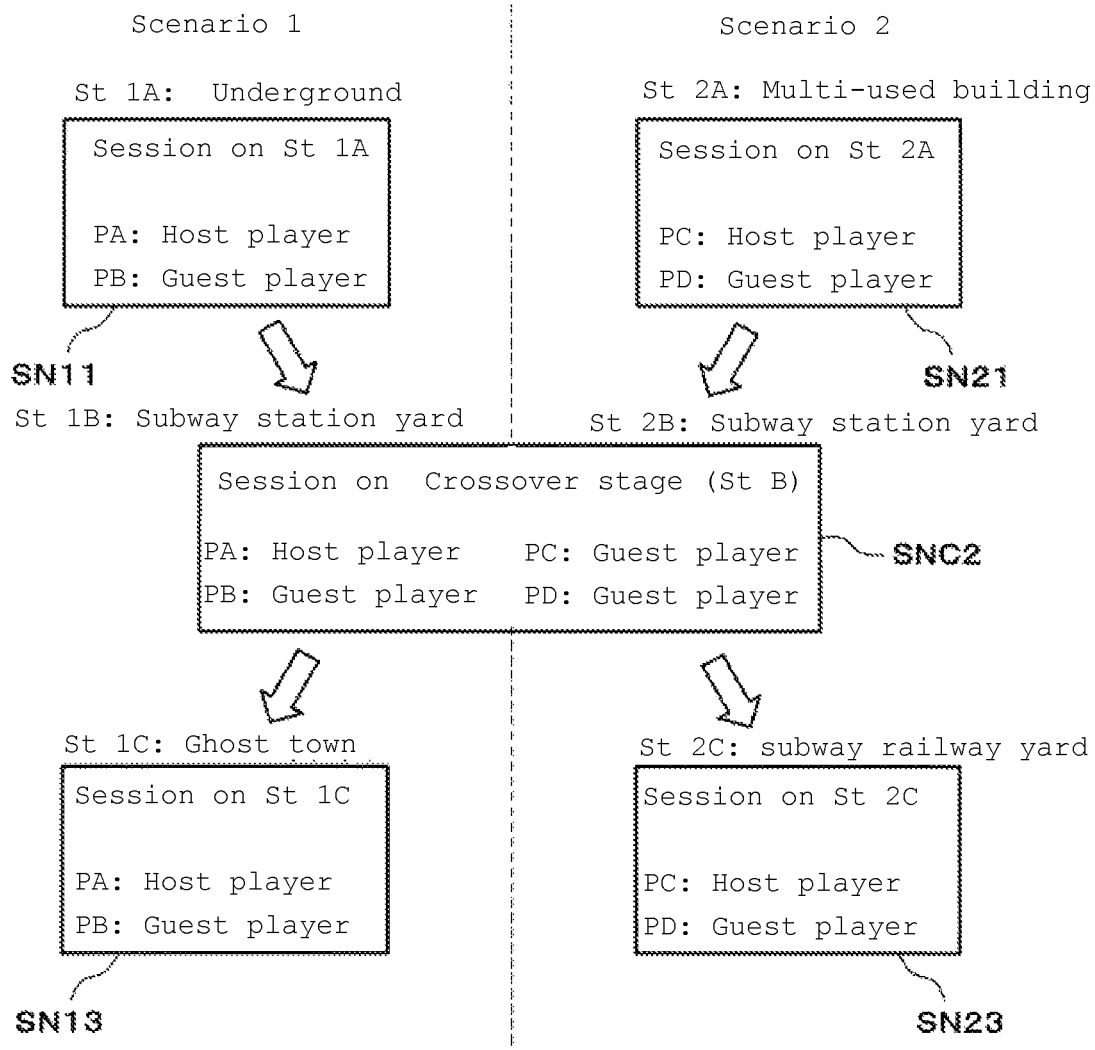
FIG. 4 is a schematic diagram illustrating a transition of users joining a session created in the process for the crossover according to one embodiment of the present invention.

In one embodiment, a participation process of user in the crossover stage is described below. FIG. 3 is a flowchart illustrating a process for a crossover according to the present invention. In FIG. 3, it is explained a computer operated by a user PA operating a player character A that is a protagonist on a first scenario. FIG. 4 is a schematic diagram illustrating a transition of users joining a session created in the process for the crossover process according to the present invention. In FIG. 4, it is illustrated the transition of users based on the game having two scenarios (scenarios 1 and 2) having two player characters on each.

In one embodiment, there are a player characters A and B in the scenario 1. And a user can operate one of player characters A or B. The scenario 1 is playable by at most two users (hereinafter a first user group) in principle. In other word, at most two users can play the scenario 1 to achieve objectives set on the scenario 1 while operating the player characters A and B. Also, the scenario 2 has the player characters C and D, and at most two users (herein after second user group) can play simultaneously in a multiplayer game.

In FIG. 4, the scenarios 1 and 2 have three stages on each. The scenario 1 is configured that the player characters A and B progress in a stage 1A (stage A) (e.g. an underground), a stage 1B (stage B) (e.g. a subway station yard), and a stage 1C (stage C) (e.g. a ghost town) in order. The scenario 2 is configured that the player characters C and D progress in a stage 2A (stage A) (e.g. multi-used building), a stage 2B (stage B) (a subway station yard), and a stage 2C (stage C) (e.g. a subway railway yard) in order.

As described above, the scenarios 1 and 2 have different stages A (stages 1A and 2A) and C (stages 1C and 2C) respectively set. On the contrary, the stage B (stages 1B and 2B) has common setting of stages (e.g. a subway station yard). In one embodiment of the present invention, the stage B is a crossover stage B. In the stage A and C of each scenario, at most two users can play simultaneously. While, in the crossover stage B, four users of each scenario can play simultaneously.

Step 1 (S1): In the stage A that the crossover is not occurred (previous stage of crossover stage), when the user PA operating player character A starts the game, the session creating unit 44 newly creates a first session (SN11). Then the session creating unit 44 creates a first session SN11 that can be joined by the user PA (first user) and a user PB (third user) operating a player character B different from the player character A. That is, on the same scenario 1, the third user PB can join the session created by the first user PA (host player) as a guest player. In the case of that the third user PB has already created a session as a host player before the first user PA starts the game, the first user PA may join the session as a guest player The communication unit 42 in a third computer CB operated by the user PB joining the SN11 created by the user PA sends information such as parameters of the player character B to the first computer CA operated by the user PA. The parameters are figures determining ability of characters. For example, the parameters include attack value, defense value, dodge, etc. The game control unit 41 in the computer CA receives the information of the player character B and stores to the own computer CA. Then, each of the communication unit 42 synchronizes mutually the computers CA and CB of the users PA and PB joining the SN 11. Step 2 (S2:) Furthermore, the game control unit 41 in the computer CA places the player characters A and B in the same virtual game space and starts the game in the stage 1 of the scenario 1. The game control unit 41 in the computers CA and CB respectively controls actions of the player characters A and B respectively to operation input by the users PA and PB. When the user PB joining the session SN11 created by the user PA is not found, only the user PA stats the game in the stage.

The game control unit 41 may place a non-player character B instead of the player character B as a character B that acts cooperatively with the player character A in the virtual game space. In this case, the NPC control unit 43 controls actions of the non-player character B.

Likewise, for player characters C and D of the scenario 2, the session creating unit 44 of a computer CC operated by a user PC creates a SN21 that is a first session for the computer CC. The game control unit 41 progresses the game in the stage 2A (previous stage of the crossover) of the scenario 2 on the basis of operation input by the users PC and PD operating the player characters C and D.

Step 3 (S3): The game control unit 41 in the computer CA determines whether the stage 1A has been over (has completed). Step 4 (S4): After the stage 1A has been over (has completed) (S3 of FIG. 3: YES), the game control unit 41 in the computer CA determines whether the stage 1B is the crossover stage that the crossover occurs on.

As illustrated in FIG. 4, when the next stage 1B is a crossover stage (S4 of FIG. 3: Yes), the communication unit 42 synchronizes the plurality of computers of users joining the crossover stage. In other word, on the scenario 1 that the first user PA and the third user PB join, during the predetermined period from the time when the stage 1A has been over (completed) to the time when the stage 1B starts, when the users PC and PD joining the scenario 2 that is different from the scenario 1 have completed the stage 2A and started the stage 2B, while keeping synchronization between the first computer CA and the third computer CB, the communication unit 42 synchronizes the first computer CA and the third computer CB, and also the second computers CC and CD operated by the users PC and PD (second user group). In one embodiment of the present invention, the stages 1B and 2B are the same crossover stage. However, the present invention is not so limited. For example, the stage 1C of the scenario 1 and a stage 2E of the scenario 2 may be set as the crossover stage.

Step 5 (S5): the communication unit 42 in the first computer CA operated by the host player (the user PA in FIG. 4) searches the second user group (users PC and PD) whose computers are able to be synchronized when the stage 1A has finished. Step 5 (S5): For example, the communication unit 42 accesses to the second computer or network server and searches the session created by the users PC and PD to join the crossover stage. Step 6 (S6): When the second computer that can be synchronized and the session created by the second user is not found (S5 of the FIG. 3: No), the session creating unit 44 in the first computer CA operated by the user PA that is the host player creates a session SNC2 and registers the user PA as the host player.

Then, when synchronizing the game with the computers CB, CC, and CD, the session creating unit 44 in the first computer CA may take over the first session SN11 joined by the first user PA and the third user PB in the previous stage 1A. Therefore, the session creating unit 44 may make the second user group PC and PD additionally join the first session SN11. Besides, the session creating unit 44 may create a new session.

Step 7 (S7): the session creating unit 44 stays in the status of that the second users PC and PD can join the new session SNC2 during predetermined period. The communication unit 42 determines whether the computer CA has received signal for joining the session SNC2. In the game communicated through P2P, for example, when the second computers CC and CD send the signal for requesting information of the session to the matching server as a signal for joining the session SNC2, the matching server processes to force the second computers join the session SNC2 without sending the list of the session as opposed to the explanation above. However, even in the crossover stage, in the same way as a normal stage, when the second computers CC and CD send the signal for requesting information of the session to the matching server as a signal for joining the session SNC2, the matching server sends the list of the session, and the users PC and PD may select the session to participate from the list.

Step 8 (S8): During predetermined period, if the second users PC and PD join the session (S7 of FIG. 3: Yes), the communication unit 42 receives information sent from the second computers CC and CD operated by the second users PC and PD (guest player) joining the session SNC2 and registers and stores the information of the guest player on the first compute CA operated by the host player PA. The information includes the parameters set for the player characters C and D respectively to the second users PC and PD. If there is a plurality of second user groups joining the session created by the host player PA, step 7 and step 8 explained above are repeated. Then the second users PC and PD are both become the guest players. Also, in the second scenario (scenario 2), when the users PC and PD joining the session SN21, the session creating unit 44 may integrate the session SN21 to the session SNC2 created by the user PA.

After registering the second users PC and PD joining the session SNC2, the communication unit 42 synchronizes the game among the computers CA, CB, CC, and CD respectively operated by the users PA, PB, PC, and PD joining the session SNC2. Step 9 (S9): Moreover, the game control unit 41 in the first computer CA places the player characters A, B, C, and D respective to the plurality of users PA, PB, PC, and PD joining the session SNC2 in the same virtual game space and starts the game in the crossover stage (stage B). The game control units 41 in the computers CA, CB, CC, and CD respectively control actions of the characters A, B, C, and D respectively to operation input by the users PA, PB, PC, and PD.

In the crossover stage, the player characters A and B of the scenario 1, and the player characters C and D of the scenario 2 may progress the game cooperatively, for example by achieving common objectives. Besides, the player characters A and B, and the player characters C and D may act separately. For example, the objective for the player characters A and B is defeating predetermined enemy character, while the objective for the player characters C and D is finding predetermined item. In addition, the scenarios may be such that if the player characters C and D have encountered the player characters A and B fighting against the enemy character while searching for the item, the player characters C and D support the player characters A and B. In the embodiment explained above, even the objectives are different between the scenarios 1 and 2 in the crossover stage, by interlinking the scenarios of the player characters A, B, C, and D, the game can be diversified.

When the second users PC and PD are not found in the predetermined period explained above (S7 of FIG. 3: No), the NPC control unit 43 in the first computer CA loads and registers the characters C and D as non-player characters. The game control unit 41 in the first computer CA places the player characters A and B respective to the uses PA and PB joining the session SNC2, and the characters C and D as non-player characters in the same virtual game space. Step 9 (S9): Then, the game control unit 41 starts the game in the crossover stage. The NPC control unit 43 controls the actions of the characters C and D instead of the operation input by the users PC and PD.

When the session created by the second users PC and PD are found on the step 5 (S5 of FIG. 3: Yes), the communication unit 42 synchronizes the game with the second computers. Specifically, the communication unit 42 accesses the second computer or network server and requests for participation in the session. Then, the communication unit 42 sends information including the parameters set for the player characters A and B respective to the users PA and PB who are the first user group to the second computer creating the session. Step 11 (S11): The information sent from the communication unit 42 is registered in the second computer as the guest player. Therefore, the host player of the session SN21 (e.g. the user PC) becomes the host player, and other users (e.g. the users PA, PB, and PD) become the guest players.

Step 9 (S9): After registering the first user group on the session SNC2 created by the second user, the game control unit 41 in the second computer places the player characters PA, PB, PC, and PD in the same virtual game space. Then the game control unit 41 in the second computer starts the game in the crossover stage.

Step 12 (S12): The session creating unit 44 determines whether the game in the crossover stage has been over (completed). Step 13 (S13): When the game in the crossover stage has been over (completed) (S12 of FIG. 3: Yes) the session creating unit 44 processes finishing the session.

As illustrated in FIG. 4, when the users PA, PB, PC, and PD all have completed the crossover stage, the session creating unit 44 in the first computer CA creates the session SN13 for the first users PA and PB on the next stage 1C. The communication unit 42 synchronizes the game in the stage 1C between the first computer CA and the third computer CB operated by the users PA and PB who participated in the session SN11. In the same way, the session creating unit 44 in the computer CC as the second computer creates the session SN23 that the second users PC and PD join. As illustrated in FIG. 4, the users PA and PC who are used to be host players in the previous stage 1A and 2A creates the sessions SN13 and SN23 as the host players. Instead, the session creating units 44 in the computers CB and CD is operated by the users PB and PD who were not host players in the stage A may respectively create the sessions SN13 and SN23.

In one embodiment of the present invention, the player characters A and B are made act together through the scenario 1, however not so limited. For example, in the next stage after having been over the crossover stage, the player character A may be made act together with the player character D, on the other hand, the player character B may be made act together with the player character C. Therefore, a plurality of (two) different scenarios is set respectively for the player characters A and B, and a part of the scenarios may be overlapped. In other word, at a part of two scenarios, the stage may have the same setting and objective (condition for completion). It is same for the player characters C and D. In such case, by making each character acting accordingly to different scenarios in the crossover stage operable for users, it is possible to match users for the sessions created on next stages simultaneously.

Figure 5:
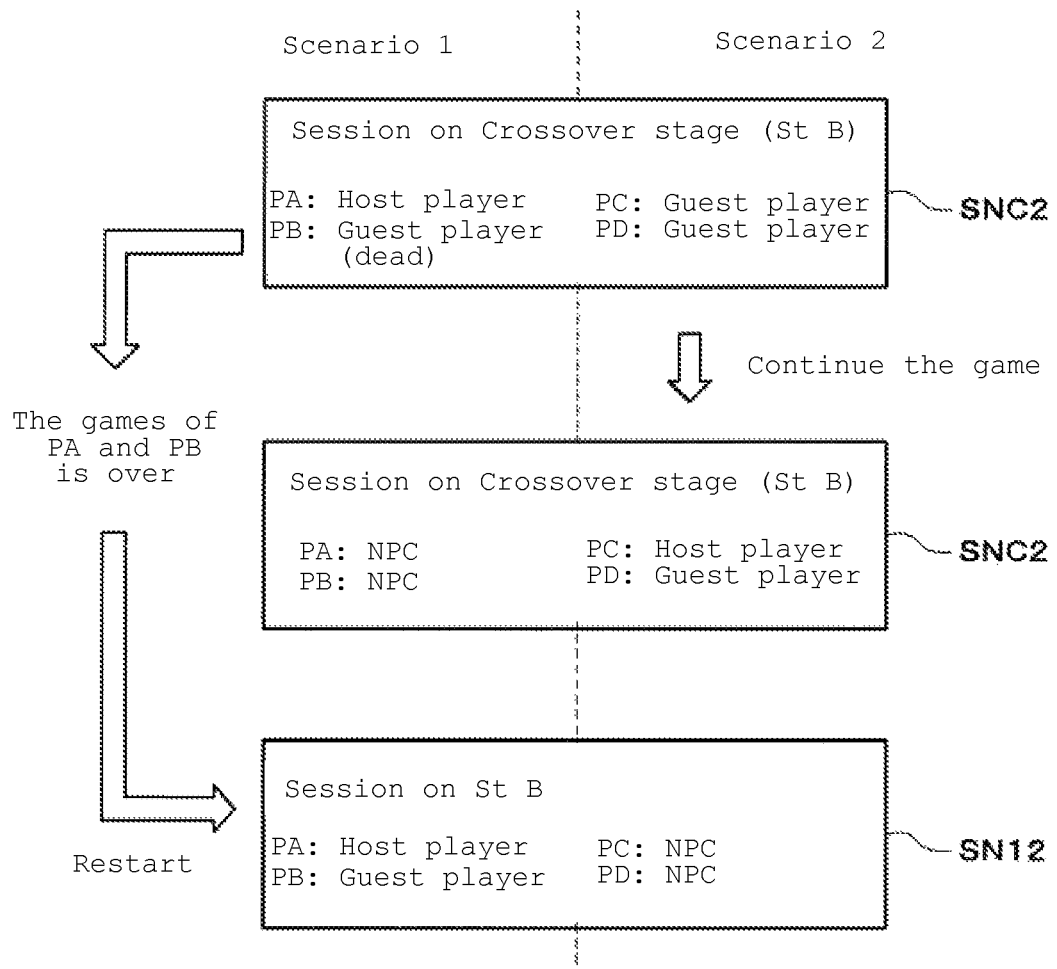
FIG. 5 is a schematic diagram illustrating a transition of participation of users in the session when the game of a first user group operating player characters A and B is over in a crossover stage according to one embodiment of the present invention.

FIG. 5 is a schematic diagram illustrating a transition of participation of users in the session when the game of a first user group operating player characters A and B is over in a crossover stage according to one embodiment of the present invention. For example, in the scenario 1, if either of the player characters A or B has died, both games of the users PA and PB will be over. In this case, in the crossover stage, when either one of the player characters A or B has died (the player character B has died in FIG. 5), both games of the users PA and PB will be over. If either one of the player characters C or D has died in the scenario 2, both games of the users PC and PD will be over. However, in the crossover stage, even when either one of the player characters A or B has died, both games of the users PC and PD will not be over.

In this case, when either one of the player characters A, B, C or D has died, and if the session SNC2 has been over, the games of the users (users PC and PD on FIG. 5) whose games should not be over will be also over.

Then, in the embodiments of the present invention, the session creating unit 44 in the computer operated by the host player withdraws the users PA and PB whose games have been over from the session SNC2. On the contrary, the session creating unit 44 continues the game keeping the users PC and PD in the session SNC2. Then, because the user PA is the host player, when the user PA leaves the session SNC2, either one of the remained users PC or PD is registered as the host player of the session SNC2. As illustrated in FIG. 5, the user PC who is used to be the host player in the session SN21 in the stage 2A is registered again as the host player of the session SNC2 in the crossover stage.

Moreover, the NPC control unit 43 sets the characters A and B as non-player characters instead of the player characters A and B operated by the users PA and PB having left from the section SNC2. In other hand, while the crossover stage is progressed synchronously between the computers CA and CB of the users PA and PB (first user group), and the computers CC and CD operated by the users PC and PD (second user group), if the second computers operated by the second user group has been out of synchronization, the NPC control unit 43 establishes the characters corresponding to the second user group as non-player characters in the virtual game space and controls their actions. Therefore, in the games of the users PC and PD, the characters A and B do not die. Also, in order to inform the users PC and PD that the player characters A and B operated by the users PA and PB become the non-player characters controlled by the NPC control unit 43, a message such as "the player characters A and B have left from the session" may be displayed on game screens of the users PC and PD.

In one embodiment of the present invention, when the game of users PA and PB is over, they can restart the game at a predetermined restarting point. As described in FIG. 5, the computer operated by either one of the users PA or PB (here, the computer CA) creates a new session SN12. Furthermore, the progress of the game made to be different form the session SNC2 that the users PC and PD continuously join. The NPC control unit 43 sets the player characters C and D as non-player characters and controls actions of the non-player characters instead of the users PC and PD.

On the basis of the condition when the game is over such that either one of the player characters A or B of the scenario 1 has died, the game of the users PC and PD may be over. In other word, whether the game of the users PC and PD to be over or continued may be changed correspondingly to the condition when the game of the player characters A and B is over.

Figure 6:
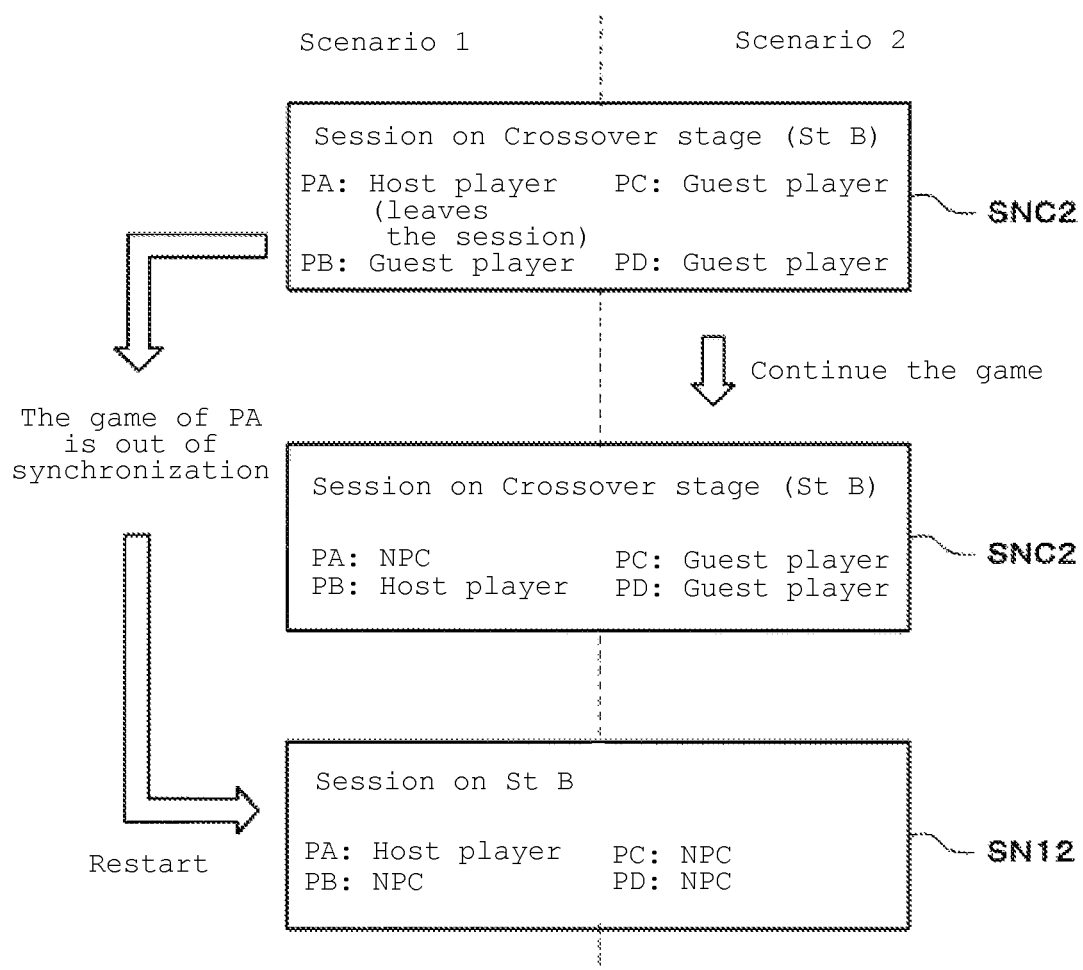
FIG. 6 is a schematic diagram illustrating a transition of users joining the session when a user PA operating a player character A leaves from the crossover stage according to one embodiment of the present invention.

FIG. 6 is a schematic diagram illustrating a transition of users joining the session when a user PA operating a player character A leaves from the crossover stage according to one embodiment of the present invention. Conditions for user's leaving from the session are not limited to the case that the game is over because a player character has died. For example, the user also leaves the session, because of communication failure or game shutdown caused by user's operation input.

In one embodiment described in FIG. 6, only the user PA out of the users PA, PB, PC, and PD joining the same session SNC2 leaves from the session SNC2 because of communication failure, for example. In such case, if the session SNC2 is dismissed when one of the users PA, PB, PC, and PD joining the session SNC2 leaves, the game of the users (users PB, PC, and PD in FIG. 6) not necessarily be over will be also over.

Then, in one embodiment, the session creating unit 44 in one of the computers operated by rest of the users joining the session SNC2 makes only the user PA whose computer has communication failure leave from the session SNC2. The session creating unit 44 continues the game on the session SNC2 still joined by the rest of the users PB, PC, and PD. In this case, because the user PA who is the host player has left, one of the users PB, PC, and PD will be registered as the host player. In one embodiment illustrated in FIG. 5, the user PB who is rest of the users of scenario 1 is registered as the host player of the session SNC2 in the crossover stage. Moreover, the NPC control unit 43 sets the character A as a non-player character instead of the player character A operated by the user PA having left from the session SNC2 and controls actions of the non-player character.

Also in this case, the user PA having left from the session SNC2 can restart the game at a predetermined restarting point. As described in FIG. 6, the computer CA newly creates the session SN12. The progress of the game of the user PA made to be different from the session SNC2 that the users PB, PC, and PD continuously join. Therefore, the NPC control unit 43 sets the characters B, C, and D as non-player characters instead of the player characters operated by the users PB, PC, and PD and controls the actions of non-player characters.

Thus, after at least one of the users PA, PB, PC and PD has left from the session SNC2, the games in the crossover stage are progressed on the sessions SNC2 and SN21 separately. Even when a user has left from the session SNC2, the session SNC2 is maintained so as to continue the game of the rest of the users whose scenarios are not affected. Therefore, the rest of the users may continue the game without feeling stress.

According to the embodiment of the present invention, in the same stages in multiplayer games, a session created by a user may be joined by another user joining another session in the middle of the game. Especially, even users operating player characters individually set for a plurality of different scenarios can join the same session. Consequently, each user operates characters individually in the stage such as that the plurality of scenarios set individually for the plurality of player characters is interlinked, so that the games can be versified every time. As described above, by diversifying ways of participation of player characters, games can be diversified effectively.

The present invention may be improved, changed, and modified without departing from the broader spirit and scope of the invention and not intended to be limited to the particular embodiments (forms) disclosed above.

For example, in the particular embodiment disclosed above, the common stage on the plurality of scenarios is set as the crossover stage. In this case, users operating playable characters set for different scenarios can join the same session in the crossover stage. However, it is not limited that the crossover stage is set on the plurality of scenarios. For example, the crossover stage may be also set on a part of one scenario. In this case, on one scenario, there are two operable player characters A and B. Then, each one of the player characters A and B progress the game separately in the same stage outside of a predetermined stage (crossover stage). For example, the player characters A and B progress the game with the same objective in the same setting of stages of each, though both player characters never encounter. In other hand, in the crossover stage, the users operating the player characters A and B can cooperatively progress the game.

In the particular embodiment disclosed above, the crossover stage is set in the middle of each scenario. However, the crossover stage may be set at the very first stage of the game (or the scenario) In this case, the predetermined period is, for example, from the operation for starting the game to the start of the game. When the crossover stage is set in the middle of the scenario, if the game data can be saved before the crossover stage, the crossover stage may be the first stage of the game if the game is restarted accordingly to the saved game data.

The embodiment of the present invention is disclosed on the basis of a stationary game console. However, the present invention can be applied to mobile game consoles, mobile phones, personal computers, etc.

INDUSTRIAL APPLICABILITY

The present invention can be useful to diversify games by diversifying ways of participation of a player character.

REFERENCE SIGNS LIST

2 game console
30 disc-type storage medium
30a game program
30b game data
41 game control unit (game control module)

42 communication unit (communication module)
43 non-player character control unit (NPC control unit, non-player character control module)
44 session creating unit (session creating module)

The invention claimed is:

1. A game system comprising:
a game control module for generating a virtual game space of a game that first, second, and third users join, the first, second, and third users operating first, second, and third characters respectively, the game control module being for progressing the game by the first, second, and third users operating the first, second, and third characters respectively by operating first, second, and third computers respectively in the virtual game space, the first and third characters being in a first scenario, the second character being in a second scenario; and
a communication module for sending and receiving data so as to synchronize the game between the first and third computers,
the first scenario including a first stage and a crossover stage being subsequent to the first stage,
the second scenario including a second stage and the crossover stage being subsequent to the second stage,
the first and third characters being not allowed to perform in the second stage,
the third character being not allowed to perform in the first stage,
the communication module synchronizing the game between the first computer and the third computer to allow the first and third characters to perform in the first stage and the crossover stage,
the game control module controlling actions of the first character and the second character in the virtual game space in the crossover stage,
the communication module synchronizing the game between the first computer and the second computer to allow the first and second characters to perform in the crossover stage.

2. The game system according to claim 1, wherein the crossover stage is common in the first and second scenarios.

3. The game system according to claim 1, wherein the communication module synchronizes the game between the first computer and the second computer while keeping the synchronization between the first computer and the third computer in the crossover stage after the first computer and the third computer are synchronized in the first stage; and
the game control module controls actions of the first character, the second character, and the third character to make act in the virtual game space in the crossover stage.

4. The game system according to claim 3, wherein the communication module keeps synchronizing the game between the first computer and the third computer, and unsynchronizes the second computer in a third stage subsequent to the crossover stage in the first scenario after the crossover stage is over.

5. The game system according to claim 1, further comprising:
a non-player character control module for controlling actions of the second character as a non-player character when the second computer is out of synchronization,
wherein the non-player character control module controls actions of the second character as the non-player character in the virtual game space on the first computer when the second computer is out of synchronization while progressing the crossover stage synchronously between the first computer and the second computer.

6. A method of controlling a game system comprising:
a step of game control for generating a virtual game space of a game that first, second, and third users join, the first, second, and third users operating first, second, and third characters respectively, and for progressing the game by operating the first, second, and third users operating in the virtual game space, the first and third characters being in a first scenario, the second character being in a second scenario; and
a step of communication for sending and receiving data so as to synchronize the game between the first and third computers;
the first scenario including a first stage and a crossover stage being subsequent to the first stage,
the second scenario including a second stage and the crossover stage being subsequent to the second stage,
the first and third characters being not allowed to perform in the second stage,
the third character being not allowed to perform in the first stage,
the step of communication including a step for synchronizing the game between the first computer and the third computer to allow the first and third characters to perform in the first stage and the crossover stage
the step of game control including a step for controlling actions of the first character and the second character in the virtual game space in the crossover stage,
the step of communication including a step for synchronizing the game between the first computer and the second computer to allow the first and second characters to perform in the crossover stage.

7. The method of controlling the game system according to claim 6,
the crossover stage is common in the first and second scenarios.

8. The method of controlling the game system according to claim 6, wherein
the step of communication includes a step for synchronizing the game between the first computer and the second computer while keeping the synchronization between the first computer and the third computer in the crossover stage; and
the step of game control includes a step for controlling actions of the first character, the second character, and the third character to make act in the virtual game space in the crossover stage.

9. The method of controlling the game system according to claim 8, wherein the step of communication includes a step for keeping synchronizing the game between the first computer and the third computer, and for unsynchronizing the second computer in a third stage subsequent to the crossover stage after the crossover stage is over.

10. The method of controlling the game system according to claim 6, further comprising:
a step of non-player character control for controlling actions of the second character as a non-player character when the second computer is out of synchronization;
wherein the step of non-player character control for controlling actions of the second character as the non-player character in the virtual game space on the first computer when the second computer is out of synchronization while progressing the crossover stage synchronously between the first computer and the second computer.

11. A non-transitory computer-readable storage medium storing a program for causing a computer to execute a process, the program comprising:
    a step of game control for generating a virtual game space of a game that first, second, and third users join, the first, second, and third users operating first, second, and third characters respectively, and for progressing the game by operating the first, second, and third users operating in the virtual game space, the first and second characters being in a first scenario, the second character being in a second scenario; and
    a step of communication for sending and receiving data so as to synchronize the game between the first and third computer;
    the first scenario including a first stage and a crossover stage being subsequent to the first stage,
    the second scenario including a second stage and the crossover stage being subsequent to the second stage,
    the step of communication including a step for synchronizing the game between the first computer and the third computer to allow the first and third characters to perform in the first stage and the crossover stage,
    the step of game control including a step for controlling actions of the first character and the second character in the virtual game space in the crossover stage,
    the step of communication including a step for synchronizing the game between the first computer and the second computer to allow the first and second characters to perform in the crossover stage.

12. The non-transitory storage medium according to claim 11, wherein the crossover stage is common in the first and second scenarios.

13. The non-transitory storage medium according to claim 11, wherein
    the step of communication includes a step for synchronizing the game between the first computer and the second computer while keeping the synchronization between the first computer and the third computer in the crossover stage; and
    the step of game control includes a step for controlling actions of the first character, the second character, and the third character to make act in the virtual game space in the crossover stage.

14. The non-transitory storage medium according to claim 13,
    wherein the step of communication includes a step for keeping synchronizing the game between the first computer and the third computer and unsynchronizing the second computer in a third stage subsequent to the crossover stage after the crossover stage is over.

15. The non-transitory storage medium according to claim 11, the program further comprising:
    a step of non-player character control for controlling actions of the second character as a non-player character when the second computer is out of synchronization,
    wherein the step of non-player character control for controlling actions of the second character as the non-player character in the virtual game space on the first computer when the second computer is out of synchronization while progressing the crossover stage synchronously between the first computer and the second computer.

* * * * *